United States Patent
Belmonte et al.

(10) Patent No.: US 12,432,530 B2
(45) Date of Patent: Sep. 30, 2025

(54) DEVICE, SYSTEM, AND METHOD FOR TRAINING MACHINE LEARNING ALGORITHMS TO GENERATE TALKGROUPS BASED ON IN-CALL DATA

(71) Applicant: MOTOROLA SOLUTIONS, INC., Chicago, IL (US)

(72) Inventors: John P. Belmonte, Schaumburg, IL (US); Konrad Gron, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 396 days.

(21) Appl. No.: 18/087,982

(22) Filed: Dec. 23, 2022

(65) Prior Publication Data

US 2024/0214779 A1 Jun. 27, 2024

(51) Int. Cl.
*H04W 4/08* (2009.01)
*G06N 20/00* (2019.01)
(Continued)

(52) U.S. Cl.
CPC .............. *H04W 4/08* (2013.01); *G06N 20/00* (2019.01); *G10L 15/063* (2013.01); *G10L 15/22* (2013.01);
(Continued)

(58) Field of Classification Search
CPC ....... H04W 4/08; G06N 20/00; G10L 15/063; G10L 15/22; G10L 15/30;
(Continued)

(56) References Cited

U.S. PATENT DOCUMENTS 6,204,844 B1 3/2001 Fumarolo et al.
8,195,215 B2 6/2012 Marocchi et al.
(Continued)

FOREIGN PATENT DOCUMENTS

EP 1701571 A1 9/2006
WO WO-2020041035 A1 2/2020
WO PCT/US2023/081036 11/2023

*Primary Examiner* — Angelica Perez
(74) *Attorney, Agent, or Firm* — PERRY + CURRIER INC. (FOR MSI)

(57) ABSTRACT

A device, system and method for training machine-learning algorithms to generate talkgroups based on in-call data is provided. The device generates, via a machine-learning algorithm, an initial talkgroup based on an incident indication of an incident, the initial talkgroup comprising communication devices communicating via channels, the machine-learning algorithm initially trained to: generate talkgroups based on incident indications; and make changes to the talkgroups. The device receives in-call data such as communications in the initial talkgroup and/or call-transmission metadata, and generates, via the machine-learning algorithm, a suggested change to the initial talkgroup based on the in-call data. The device determines a machine-learning score of the initial talkgroup or the suggested change, indicative of a threshold-based positive or negative reinforcement of efficiency of the initial talkgroup or the suggested change, and implements a machine-learning feedback loop that provides the score to the machine-learning algorithm for further training thereof.

18 Claims, 4 Drawing Sheets

(51) Int. Cl.
*G10L 15/06* (2013.01)
*G10L 15/22* (2006.01)
*G10L 15/30* (2013.01)

(52) U.S. Cl.
CPC ........ *G10L 15/30* (2013.01); *G10L 2015/225* (2013.01)

(58) Field of Classification Search
CPC ........ G10L 2015/225; H04M 2201/40; H04M 2203/2044; H04M 3/2281; H04M 3/56
See application file for complete search history.

(56) References Cited

U.S. PATENT DOCUMENTS

| | | | |
|---|---|---|---|
| 8,805,431 B2 | 8/2014 | Vasavada et al. | |
| 9,730,026 B2 | 8/2017 | Wawrowski et al. | |
| 9,978,283 B2 | 5/2018 | Jedrzejewski et al. | |
| 10,257,740 B2 | 4/2019 | McDonald et al. | |
| 10,445,745 B1 * | 10/2019 | Chopra | G06F 16/3344 |
| 10,719,900 B2 | 7/2020 | Griesmann et al. | |
| 10,764,725 B1 * | 9/2020 | Lim | H04W 84/08 |
| 11,140,553 B1 * | 10/2021 | Taylor | H04W 12/122 |
| 2007/0036118 A1 | 2/2007 | Shaffer et al. | |
| 2014/0243034 A1 | 8/2014 | Gurney et al. | |
| 2019/0318035 A1 * | 10/2019 | Blanco | G06F 16/9535 |
| 2020/0100069 A1 * | 3/2020 | Yang | H04W 4/08 |

\* cited by examiner

DEVICE, SYSTEM, AND METHOD FOR TRAINING MACHINE LEARNING ALGORITHMS TO GENERATE TALKGROUPS BASED ON IN-CALL DATA

BACKGROUND OF THE INVENTION

In public-safety environments, talkgroups may be generated in a manner that leads to inefficient use of network resources.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
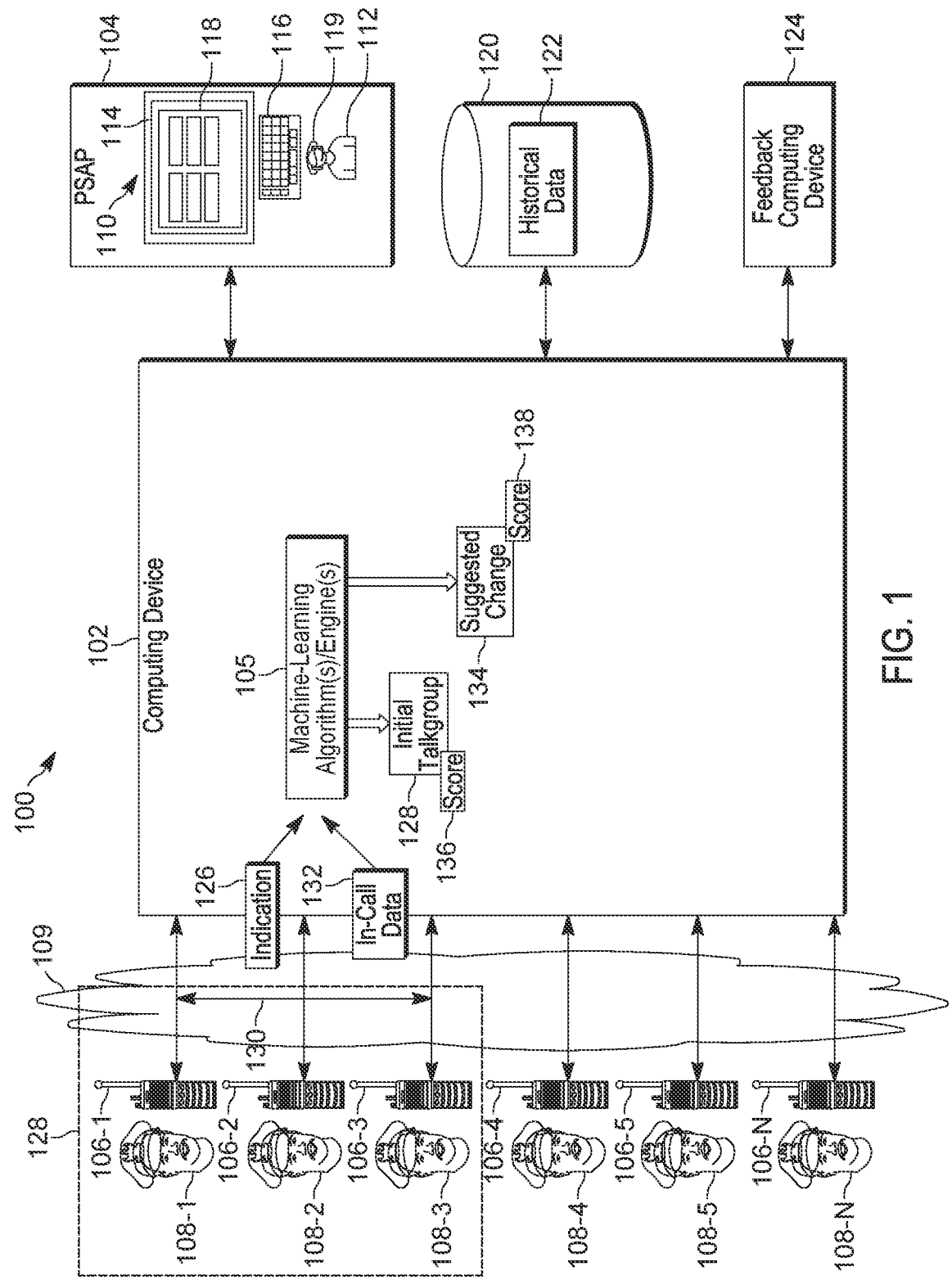
FIG. 1 is a system for training machine-learning algorithms to generate talkgroups based on in-call data, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In public-safety environments, talkgroups may be generated in a manner that leads to inefficient use of network resources. For example, when an incident occurs, a machine-learning algorithm may generate a static talkgroup based solely on an incident type, and the static talkgroup may or may not lead to efficient use of network resources by communication devices in the static talkgroup (e.g., operated by public-safety officers). During the duration of the talkgroup, however, in-call data may be received that indicates inefficient use of network resources. Thus, there exists a need for an improved technical method, device, and system for training machine-learning algorithms to generate talkgroups based on in-call data.

Hence, provided herein is a device, system and method for training machine-learning algorithms to generate talkgroups based on in-call data. For example, a system is provided that includes a computing device that implements one or more machine-learning algorithms to generate an initial talkgroup for an incident, based on an incident indication, which may indicate a type of the incident. For example, the incident may be a traffic incident, such as a major vehicle crash with injuries, and a machine-learning algorithm may generate an initial talkgroup to respond to the major vehicle crash with injuries. A talkgroup is understood to comprise a group of communication devices that communicate on one or more given channels, so that certain public-safety officers associated with the communication devices may communicate in order to respond to an incident, such as the traffic incident. However, the initial talkgroup may include communication devices that are not active (e.g., are not used to communicate) in the initial talkgroup, for example due to associated public-safety officers not using their respective communication devices. Nonetheless, such communication devices may continue to receive talkgroup related network data, such as timeslot data, and the like, for scheduling communications on the initial talkgroup, which is an inefficient use of network resources and bandwidth (e.g., timeslot data is transmitted to communication devices that are not active in the initial talkgroup). Conversely, due to a number of communication devices of the initial talkgroup, there may be an undue number of "busys" in the initial talkgroup, for example when subsets of the communication devices attempt to transmit at the same time, leading to communications in the initial talkgroup being delayed and/or failing, and the like, which is also an inefficient use of network resources, as well as a waste of processing resources at the communication devices.

However, the computing device may generally monitor and/or receive in-call data for the initial talkgroup, which may be used to change the talkgroup to more efficiently use network resources. Such in-call data may comprise one or more of communications in the initial talkgroup and call-transmission metadata of the initial talkgroup. Such communications may comprise verbal communications (e.g., converted to text) and/or text communications, and the like. The call-transmission metadata may comprise push-to-talk (PTT) data, trunking data, and the like, which may indicate numbers of active participants in the initial talkgroup (e.g., a number of a subset of communication devices that are communicating in the initial talkgroup), numbers of "busys" (described below), and the like.

Based on the in-call data, the one or more machine-learning algorithms may suggest a change (e.g., a suggested change) to the initial talkgroup, which may be implemented on the initial talkgroup. Such a suggested change may include removing a communication device from the initial talkgroup, adding a communication device to the initial talkgroup, changing the initial talkgroup to a different talkgroup of respective communication devices (e.g., which may or may not include one or more of the communication devices of the initial talkgroup), and/or any other suitable change.

The computing device may determine a machine-learning score of the initial talkgroup or the suggested change. For example, such a machine-learning score may be indicative of a threshold-based positive reinforcement of efficiency of the initial talkgroup or the suggested change, or such a machine-learning score may be indicative of a threshold-based negative reinforcement of efficiency of the initial talkgroup or the suggested change. Machine-learning scores may be determined in various ways, and may be determined concurrent with the generation of an initial talkgroup and/or a suggested change, and/or machine-learning scores may be determined after the generation of an initial talkgroup and/or a suggested change, as described herein. For example, when the one or more machine-learning algorithms generates the initial talkgroup, the one or more machine-learning algorithms may output an associated machine-learning score. Alternatively, data indicative of the initial talkgroup or the suggested change, along with the in-call data (e.g., after generation of the initial talkgroup, and/or before and after the suggested change) may be provided to a device, which may generate the score from such data.

Furthermore, determining whether a machine-learning score is a positive or negative reinforcement of efficiency is understood to be threshold based. For example, a machine-learning score that is above a given threshold may be understood to be indicative of a threshold-based positive reinforcement of efficiency of an initial talkgroup or a suggested change, while a machine-learning score that is below the given threshold may be understood to be indicative of a threshold-based negative reinforcement of efficiency of the initial talkgroup or the suggested change.

Hence, while the term "efficiency" is understood to be relative, such a term as used herein is understood to have an underlying technical meaning.

The computing device may implement a machine-learning feedback loop that includes providing the machine-learning score, along with associated training data, to the one or more machine-learning algorithms to further train the one or more machine-learning algorithms.

In this manner, the in-call data is used to train the one or more machine-learning algorithms to better generate talkgroups.

An aspect of the present specification provides a method comprising: generating, at a computing device, via one or more machine-learning algorithms, an initial talkgroup based on an incident indication of an incident, the initial talkgroup comprising communication devices that communicate on one or more given channels, the one or more machine-learning algorithms initially trained to: generate talkgroups based on incident indications; and make changes to the talkgroups; receiving, at the computing device, in-call data comprising one or more of communications in the initial talkgroup and call-transmission metadata; generating, at the computing device, via the one or more machine-learning algorithms, a suggested change to the initial talkgroup based on the in-call data; determining, at the computing device, a machine-learning score of the initial talkgroup or the suggested change, the machine-learning score indicative of a threshold-based positive reinforcement or a threshold-based negative reinforcement of efficiency of the initial talkgroup or the suggested change; and implementing, at the computing device, a machine-learning feedback loop that includes providing the machine-learning score to the one or more machine-learning algorithms to further train the one or more machine-learning algorithms.

Another aspect of the present specification provides a device comprising: a communication interface; and a controller configured to: generate, via one or more machine-learning algorithms, an initial talkgroup based on an incident indication of an incident, the initial talkgroup comprising communication devices that communicate on one or more given channels, the one or more machine-learning algorithms initially trained to: generate talkgroups based on incident indications; and make changes to the talkgroups; receive, via the communication interface, in-call data comprising one or more of communications in the initial talkgroup and call-transmission metadata; generate, via the one or more machine-learning algorithms, a suggested change to the initial talkgroup based on the in-call data; determine a machine-learning score of the initial talkgroup or the suggested change, the machine-learning score indicative of a threshold-based positive reinforcement or a threshold-based negative reinforcement of efficiency of the initial talkgroup or the suggested change; and implement a machine-learning feedback loop that includes providing the machine-learning score to the one or more machine-learning algorithms to further train the one or more machine-learning algorithms.

Each of the above-mentioned aspects will be discussed in more detail below, starting with example system and device architectures of the system, in which the embodiments may be practiced, followed by an illustration of processing blocks for achieving an improved technical method, device, and system for training machine-learning algorithms to generate talkgroups based on in-call data.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, the term "engine", such as a machine-learning engine, is understood to refer to hardware, and/or a combination of hardware and software (e.g., a combination of hardware and software includes software hosted at hardware, such as a software module that is stored at a processor-readable memory implemented or interpreted by a processor), or hardware and software hosted at hardware and/or implemented as a system-on-chip architecture and the like.

Herein, the term "talkgroup" is understood to include a group of communication devices that communicate via a given channel and/or channels. For example, communication devices are generally configured to communicate via channels, and/or communication channels, which includes, but is not limited to, a physical radio-frequency (RF) communication channel, a logical radio-frequency communication channel, a trunking talkgroup, a trunking announcement group, a VOIP (Voice-over-internet-protocol) communication path, a push-to-talk channel, and the like. Indeed, groups of channels may be logically organized into talkgroups, and/or dynamically allocated into talkgroups, though channels of a talkgroup may be dynamic as the traffic (e.g., communications) of a talkgroup may increase or decrease, and channels assigned to the talkgroup may be adjusted accordingly. Hence, calls and/or communications on talkgroups as described herein may include, but are not limited to, push-to-talk (PTT) calls, VOIP calls, cell phone calls, and the like, adapted for broadcast of communication data.

Further advantages and features consistent with this disclosure will be set forth in the following detailed description, with reference to the drawings.

Attention is directed to FIG. 1, which depicts an example system 100 for training machine-learning algorithms to generate talkgroups based on in-call data. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a computing device 102, which may generally be configured as a proxy device for at least one public-safety answering point (PSAP) 104, for example to assist at generating talkgroups on behalf of the at least one PSAP 104, as described herein, using one or more machine-learning algorithms 105, which, as depicted, may be implemented as one or more machine-learning engines. For simplicity, the one or more machine-learning algorithms 105 and/or one or more machine-learning engines are interchangeably referred to hereafter as a machine-learning algorithm 105.

The computing device 102 may comprise any suitable combination of one or more servers, one or more cloud computing devices, one or more proxy devices, and the like. For example, the computing device 102 may act as a proxy for the PSAP 104, for example to convey communications between the PSAP 104 and the communication devices 106.

While only one PSAP 104 is depicted, the computing device 102 may be configured as a proxy device for a plurality of PSAPs, for example for different jurisdictions and/or locations. In general, the PSAP 104 may handle public-safety related calls, including, but not limited to "911" calls, and the like, which report incidents (e.g., public-safety incidents), and/or the PSAP 104 may dispatch public-safety officers (e.g., police, firefighters, emergency medical technicians, and the like) to incidents and/or communicate with such public-safety officers on associated communication devices, and the computing device 102 may act as a proxy for the PSAP 104 in such situations.

For example, as depicted, the computing device 102 may be configured to generate talkgroups of communication devices 106-1, 106-2, 106-3, 106-4, 106-5 . . . 106-N, operated, for example by respective public-safety officers 108-1, 108-2, 108-3, 108-4, 108-5 . . . 108-N. The communication devices 106-1, 106-2, 106-3, 106-4, 106-5 . . . 106-N are interchangeably referred to hereafter, collectively, as the communication devices 106 and, generically, as a communication device 106. This convention will be used elsewhere in the present specification. For example, the public-safety officers 108-1, 108-2, 108-3, 108-4, 108-5 . . . 108-N are interchangeably referred to as the public-safety officers 108 (and/or the officers 108), and/or a public-safety officer 108 (and/or an officer 108).

While there are six (e.g., N=6) communication devices 106 and associated officers 108 depicted, the system 100 may comprise any suitable number of communication devices 106 and officers 108. Put another way, "N" may be any suitable number including, but not limited to, tens of communication devices 106 and officers 108, hundreds of communication devices 106 and officers 108, thousands of communication devices 106 and officers 108, and the like. Furthermore, the number "N" of communication devices 106 and officers 108 may change as officers 108 go on or off shifts, and the like.

Once a talkgroup has been generated, the communication devices 106 may communicate over one or more given channels, for example via at least one network 109 (hereafter the network 109), which may comprise any suitable combination of wireless and wired networks. In particular, while it is understood that the communication devices 106 generally communicate wirelessly, communications within the network 109, and/or with the computing device 102, may occur in a wired manner. Hence, the communication links between the communication devices 106 and the computing device 102 are understood to be via the network 109, and communication links between the communication devices 106 are also understood to be via the network 109.

While the communication devices 106 are depicted as hand-held radios, a communication device 106 may comprise any suitable communication device configured to communicate via talkgroups, and that may be operated by public-safety personnel, such as the officers 108, including, but not limited to, a patrol car radio, a radio having a cell-phone configuration, and the like.

Furthermore, while the officers 108 are depicted as police officers, an officer 108 may comprise any suitable public-safety personnel, such as a firefighter, an emergency medical technician (EMT), and the like. Furthermore, such public-safety personnel may include, but are not limited to, private enterprise employees that have a public-safety function, such as security guards, and the like; as such, the PSAP 104 may comprise, and/or be in communication with, an enterprise-safety answering point operated by a private enterprise, which may handle calls and/or texts to an associated emergency services telephone number (e.g., associated with the private enterprise), and the like, such as a telephone number of a security guard station, and the like.

As depicted, the PSAP 104 may include a PSAP terminal 110, which may be operated by an operator 112, and the PSAP terminal 110 may comprise a display screen 114 and an input device 116 (e.g., as such a keyboard, as depicted, a pointing device and/or any other suitable input device). However, the display screen 114 and the input device 116 may be provided in any suitable format (e.g., different from a PSAP terminal), such as a laptop, a personal computer, and the like (e.g., when the operator 112 is working from home and/or "off-premises" from the PSAP 104). In general, the display screen 114 and the input device 116 may be used to interact with the PSAP terminal 110, for example via an interface 118 provided at the display screen 114, and the like. The PSAP terminal 110 further comprise a communication device, for example as represented in FIG. 1 by a headset 119 worn by the operator 112.

As depicted, the computing device 102 is further in communication with a memory 120, which may be provided in the form of a database, and the like. The memory 120 may be separate from the computing device 102 (e.g., as depicted) and/or the memory 120 may be at least partially integrated with the computing device 102. As will be explained in further detail below, the memory 120 may store historical data 122, which may be used to train the machine-learning algorithm 105.

Figure 4:
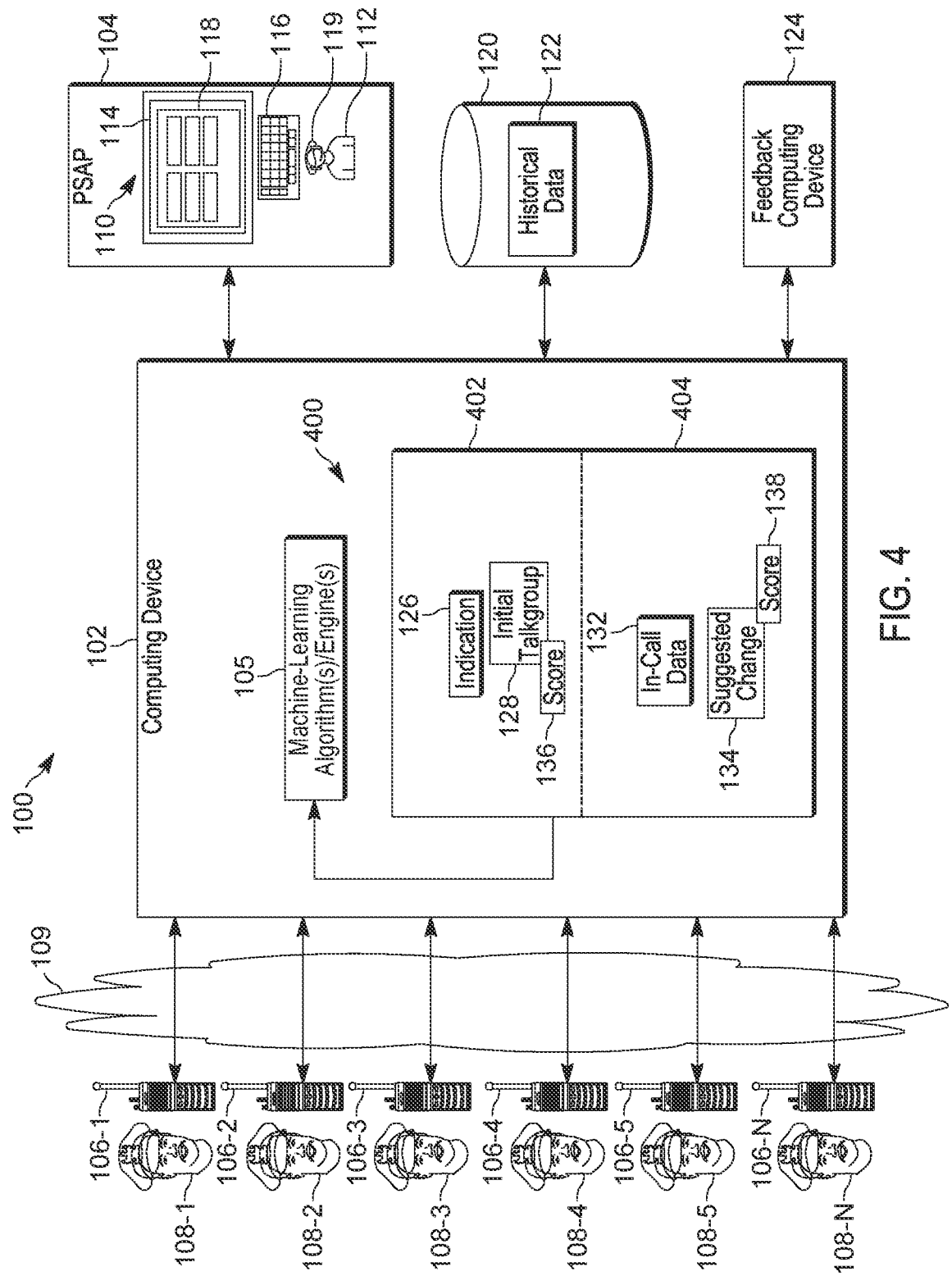
FIG. 4 depicts aspects of an example of a machine-learning feedback loop implemented in a method for training machine-learning algorithms to generate talkgroups based on in-call data being implemented by the system of FIG. 1 in accordance with some examples.

As depicted, the computing device 102 may be in communication with an optional feedback computing device 124 generally configured to verify and/or generate data used in a machine-learning feedback loop, as described in more detail herein and in particular with respect to FIG. 4.

In general, the computing device 102 is configured to receive an incident indication 126 (e.g., the indication 126) of an incident, which, for example, may identify an incident, such as a public-safety incident, which has occurred. The indication 126 may identify a type of the incident (e.g., such as a traffic incident (e.g., a major vehicle crash with injuries), a robbery, and the like), a location of the incident, and the like. While the indication 126 is depicted as being received from one of the communication devices 106 and/or via the network 109, the indication 126 may be received from the PSAP 104 (e.g., a caller may have called the PSAP 104 and reported the incident and the PSAP 104 may generate the indication 126 accordingly), and/or the indication 126 may be retrieved from a database of such incident indications (e.g., the indication 126 may be retrieved in the form of an incident report stored in such a database).

Regardless of how the computing device 102 obtains the indication 126, the computing device 102 is further configured to generate an initial talkgroup based on the incident indication 126 using the machine-learning algorithm 105. For example, the machine-learning algorithm 105 is understood to have been initially and/or previously trained (e.g., using previous implementations of a machine-learning feedback loop) to generate talkgroups based on incident indications, and make changes to the talkgroups, for example based on the historical data 122, which may store machine-learning scores for previously generated talkgroups and previous changes made to the previously generated talkgroups.

It is furthermore understood that the machine-learning algorithm 105 may be configured to generate an initial talkgroup according to a given incident type, for example as indicated by the indication 126. Put another way, training of the machine-learning algorithm 105 may be for particular incident types, and the like, such that the machine-learning algorithm 105 may be configured to generate an initial talkgroup for a traffic incident and generate a different initial talkgroup for a robbery incident, and the like. Similarly, the machine-learning algorithm 105 may be configured to generate an initial talkgroup for a police incident and generate a different initial talkgroup for a fire incident, and the like.

Furthermore, generation of an initial talkgroup may be based on skills and/or ranks and/or locations, and the like, of the officers 108, which may be stored at a database (e.g., such as a database of the memory 120 or another database).

Using the example of the indication 126 identifying a traffic incident with injuries, the machine-learning algorithm 105 may have been trained to select an officer 108 with medical training, an officer 108 with traffic accident training, and an officer 108 to traffic control training (e.g., trained in directing traffic), with associated communication devices 106 added to the initial talkgroup. The association between the officers 108 and the communication devices 106 may also be stored at a database such that the machine-learning algorithm 105 may generate the initial talkgroup by first selecting officers 108 to respond to the incident indicated by the indication 126, and adding associated communication device 106 to the initial talkgroup.

Furthermore, selecting the officers 108 may occur on the basis of any suitable combination of associated training, rank, public-safety entity association and/or location (e.g., relative to an incident), amongst other possibilities. For example, an officer 108 with medical training may be associated with an EMT entity and may be within a threshold distance (e.g., 1 km, 2 kms, amongst other possibilities) from the incident, another officer 108 with traffic accident training may be associated with a police entity or a firefighter entity (e.g., due to the possible occurrence of fires at traffic incidents) and may also be within the threshold distance, and yet another officer 108 with traffic control training may be associated with a police entity and may also be within the threshold distance.

Furthermore, selecting the officers 108 may occur on the basis of any suitable combination of available audio, images video, and/or other type of data and/or multimedia data, associated with an incident, amongst other possibilities. For example, the indication 126 may include audio, images video, and/or other type of data and/or multimedia data collected at the scene of an incident, which may indicate, for example, that an incident is a traffic incident, or another type of incident, and/or whether there is a fire and/or injuries at the incident, and/or whether or not a crime is occurring in association with the incident, with officers 108 selected accordingly.

Furthermore associations between officers 108 and communication devices 106 may be static or dynamic. For example, a communication device 106 may be permanently dedicated to a given officer 108, or a communication device 106 may be assigned to an officer 108 at the start of a shift, and the like, and assigned to another officer 108 after the end of the shift. A database (e.g., such as a database of the memory 120 or another database) may be used to store such static or dynamic associations, and updated as the associations change. As such, when the officers 108 are selected, such a database may be accessed to determine associated communication devices 106 that may be added to the initial talkgroup.

In a depicted example, the machine-learning algorithm 105 may generate an initial talkgroup 128 of the communication devices 106-1, 106-2, 106-3 that may communicate via a channel 130 implemented by the network 109.

As depicted, the machine-learning algorithm 105 is outputting the initial talkgroup 128 using the indication 126 as input. It is understood that the initial talkgroup 128 output by the machine-learning algorithm 105 comprises any suitable set of data that may be provided to the communication devices 106-1, 106-2, 106-3, for example via the network 109, to enable the communication devices 106-1, 106-2, 106-3 to communicate over the channel 130. The data may include data for configuring a setting at respective input devices (e.g., respective knobs) at the communication devices 106-1, 106-2, 106-3 to be assigned to the initial talkgroup 128, such that, when a respective input device is set to such a setting, a communication device 106, of the communication devices 106-1, 106-2, 106-3, communicates over the initial talkgroup 128, for example using respective PTT buttons, and the like.

In some examples, the initial talkgroup 128 output by the machine-learning algorithm 105 may be provided to the communication devices 106-1, 106-2, 106-3 in a dispatch command, and the like, to dispatch the communication devices 106-1, 106-2, 106-3 and/or the associated officers 108-1, 108-2, 108-3, to a location of the incident.

As depicted, the initial talkgroup 128 formed by the communication devices 106-1, 106-2, 106-3 is further indicated by a dashed line around the communication devices 106-1, 106-2, 106-3 and the channel 130, to indicate that the communication devices 106-1, 106-2, 106-3 of the initial talkgroup 128 communicate over the channel 130. While only one channel 130 is depicted, any suitable number of channels over which the communication devices 106-1, 106-2, 106-3 of the initial talkgroup 128 communicate is within the scope of the present specification and furthermore it is understood that a number of the channels of the initial talkgroup 128 may be changed dynamically via components of the network 109, and the like.

Furthermore, the initial talkgroup 128 output by the machine-learning algorithm 105 may include data provided to components of the network 109, to enable the network 109 to provide communications for the initial talkgroup 128 over the channel 130. For example, such components may provide time-slot data to the communication devices 106, which instruct the communication devices 106 as to when they may respectively communicate in the initial talkgroup 128.

While not depicted, in some examples, the PSAP terminal 110, may be automatically added to the initial talkgroup 128. In these examples, the PSAP terminal 110 may also be in communication with the network 109 and communicate on the channel 130, enabling the operator 112 to speak in the initial talkgroup 128 (e.g., via actuation of a PTT button, and the like, of the PSAP terminal 110).

As depicted, the computing device 102 may further receive in-call data 132 from the initial talkgroup 128, for example via the network 109. The in-call data 132 may comprise one or more of communications in the initial talkgroup 128 and call-transmission metadata.

For example, the in-call data 132 may comprise communications in the initial talkgroup 128, including, but not limited to, voice communications (e.g., of the officers 108-1, 108-2, 108-3, as transmitted by the communication devices 106-1, 106-2, 106-3), which may be converted to text by a voice-text module of the computing device 102, text communications (e.g., text messages transmitted by the communication devices 106-1, 106-2, 106-3), and the like. Hence, for examples, the computing device 102 may be monitoring communications in the initial talkgroup 128.

Such communications in the initial talkgroup 128 may include keywords, and the like, indicative of whether or not network resources associated with the initial talkgroup 128 are being used efficiently. For example, the officer 108-1 in the initial talkgroup 128 may say "Good job officers 1082, 1083", and one or more of the officers 108-2, 108-3 may respond with "Thanks, communications are going well", which may indicate that network resources associated with the initial talkgroup 128 are being used efficiently. Conversely, the officer 108-1 in the initial talkgroup 128 may say "Officer 1082 hasn't showed up at the scene" indicating that network resources associated with the initial talkgroup 128 are not being used efficiently (e.g., as the communication device 106-2 will receive talkgroup related network data of the initial talkgroup 128, such as timeslot data, and the like, for scheduling communications on the initial talkgroup, even though the communication device 106-2 is not being used by the officer 108-2 to communicate in the initial talkgroup 128).

In some of these examples, the PSAP terminal 110 may be participating in the initial talkgroup 128 and the operator 112 may ask a question such as "Was this talkgroup efficient?"; in these examples keywords such as "Yes" (e.g., as a reply by one or more of the officers 108-1, 108-2, 108-3) may be indicative that network resources associated with the initial talkgroup 128 were being used efficiently, while keywords such as "No" (e.g., as a reply by one or more of the officers 108-1, 108-2, 108-3) may be indicative that network resources associated with the initial talkgroup 128 were not being used efficiently.

Alternatively, and/or in addition, a question such as "Was this talkgroup efficient?" may be presented at the display screen 114 (e.g., in a form of a pop-up notification, and the like), along with selectable options which, when selected, may indicate whether network resources associated with the initial talkgroup 128 were being used efficiently. Such selectable options may include electronic buttons such as "Yes" and "No" button, and/or such selectable options may include electronic buttons that "rate" network resources associated with the initial talkgroup 128 were being used efficiently on any suitable scale such as "0" to "5", "0" to "10", "0" to "100", where "0" is a lowest indicator of efficiency and "5" or "10" or "100" is a highest indicator of efficiency, amongst other possibilities.

Alternatively, and/or in addition, the in-call data 132 may comprise call-transmission metadata (e.g., talkgroup related network data) of the initial talkgroup 128. In particular, in a talkgroup, it is understood that only one communication device 106 at a time may transmit communications, for example in a scheduled time-slot and upon actuation of a PTT button at a communication device 106 (which may also be referred to keying of a PTT button). Such scheduled time-slots may be provided to the communication devices 106 of a talkgroup, and PTT data and/or trunking data may be generated by components the communication devices 106 and/or by components of the network 109 over which the channel 130 operates, which indicate which communication device 106 is transmitting communications in a talkgroup at any given time, when one communication device 106 ends a communication and another communication device 106 starts a communication, when more than one communication device 106 attempts to transmit communications at a same time, and the like. Hence, such call-transmission metadata may include, but is not limited to, PTT data, trunking data, and the like.

In particular, PTT data generally indicates when PTT buttons of the communication devices 106-1, 106-2, 106-3 are actuated. Trunking data may further indicate when communication devices 106-1, 106-2, 106-3 are transmitting communications and/or for how long, and the like.

Hence, the call-transmission metadata may generally indicate which of the communication devices 106-1, 106-2, 106-3 are active in the initial talkgroup 128 and/or durations of activity by the communication devices 106-1, 106-2, 106-3 in the initial talkgroup 128.

For example, when a communication device 106 has not had its respective PTT button keyed and/or actuated, and/or the communication device 106 had its respective PTT button keyed and/or actuated lower than a threshold number of times (e.g., 1 time, 2 times, 3 times, amongst other possibilities) and/or actuation of a respective PTT button of the communication device 106 is lower than a threshold rate, the communication device 106 may be determined to be inactive in the initial talkgroup 128. Similarly, when a communication device 106 has been active for less than a threshold time period (e.g., 30 seconds, 1 minute, 2 minutes, amongst other possibilities), a communication device 106 may be determined to be inactive in the initial talkgroup 128.

In some examples, the threshold number of times for PTT button keying and/or the threshold time period, may be relative to time and/or a duration of the initial talkgroup 128. For example, the threshold number of times may be a number of keys of a PTT button per minute, and the like.

Similarly, the threshold time period may be a percentage of the total time period of the duration of the initial talkgroup 128 (e.g., 2%, 5%, 10%, amongst other possibilities). For example, once the incident indicated by the indication 126 is resolved, the initial talkgroup 128 may end (e.g., under control of the computing device 102), and a time between the initial talkgroup 128 starting and ending may comprise the duration of the initial talkgroup 128.

A communication device 106 being active in a talkgroup may generally indicate efficient use of network resources, while communication device 106 being inactive in a talkgroup may generally indicate inefficient use of network resources.

Similarly, the call-transmission metadata may generally indicate timing of the communications of the communication devices 106-1, 106-2, 106-3 relative to each other. A time, and/or an average time, between one communication device 106 ending a transmission, and another communication device 106 starting a transmission may indicate efficient or inefficient used of network resources in a talkgroup. For example, a time, and/or an average time, between one communication device 106 ending a transmission, and another communication device 106 starting a transmission may be compared to a threshold time period. In particular, the time, and/or an average time, between one communication device 106 ending a transmission, and another communication device 106 starting a transmission being less than the threshold time period, may indicate inefficient use of network resources; conversely, the time, and/or an average time, between one communication device 106 ending a transmission, and another communication device 106 starting a transmission being greater than the threshold time period, may indicate an efficient use of network resources. Such a threshold time period may be selected to indicate such efficiency/inefficiency and may be 0.1 seconds, 0.5 seconds, 1 second, amongst other possibilities. In particular the threshold time period may be selected such that when the time, and/or an average time, between one communication device 106 ending a transmission, and another communication device 106 starting a transmission is less than the threshold time period, the communication devices 106 may be attempting to talk over each other, and while such communications may be successful, the duration of the threshold time period may indicate near-misses of "busys" in a talkgroup.

Similarly, the call-transmission metadata may generally indicate when a communication device 106-1, 106-2, 106-3 attempts to transmit communications but is denied the transmission as another communication device 106-1, 106-2, 106-3 is presently transmitting communications. Put another way, the call-transmission metadata may comprise "busy" data, indicating for example, when a communication device 106-1, 106-2, 106-3 tries to start a transmission in the initial talkgroup 128, but another of the communication devices 106-1, 106-2, 106-3 is transmitting, such that the communication device 106 that attempted to transmit is met with a busy signal, and/or is prevented from transmitting, and the like. A number of "busys" and/or a rate of "busys" being above a threshold number or threshold rate, may indicate an inefficient use of network resources in a talkgroup, and conversely a number of "busys" and/or a rate of "busys" being below the threshold number or the threshold rate, may indicate an efficient use of network resources in a talkgroup. A threshold rate of "busys" may be 1 "busy"/minute, 1 "busy"/2 minutes, 1 "busy"/3 minutes, amongst other possibilities.

The call-transmission metadata may further be used to determine a usage time of the initial talkgroup 128, for example, relative to the duration of the incident; such usage time may comprise the sum of the times that the communication devices 106-1, 106-2, 106-3 used the initial talkgroup 128 to communicate. The usage time being below a threshold usage time may indicate inefficient use of network resources in a talkgroup, while the usage time being above the threshold usage time may indicate efficient use of network resources in a talkgroup. For example, the threshold usage time may be 60%, 70%, 80%, amongst other possibilities, of the duration of the incident.

As depicted in FIG. 1, after the initial talkgroup 128 is generated, the machine-learning algorithm 105 may receive the in-call data 132 as input and generate a suggested change 134 to the initial talkgroup 128 based on the in-call data 132. For example, the suggested change 134 may include, but is not limited to, adding a communication device 106 (e.g., a communication device 106-4, 106-5) to the initial talkgroup 128, removing a communication device 106 (e.g., a communication device 106-1, 106-2, 106-3) from the initial talkgroup 128, changing the initial talkgroup 128 to a different talkgroup (e.g., such as a group of the communication devices 106-1, 106-3, 106-4, 106-5), and the like. In general, the suggested change 134 may comprise an attempt by the machine-learning algorithm 105 to more efficiently use network resources in relation to the initial talkgroup 128, for example to decrease a number of "busys", to remove inactive communication devices 106 and/or add active communication devices 106, and the like.

The suggested change 134 may be implemented when generated, such that the initial talkgroup 128 is changed on the basis of the suggested change 134. Alternatively, an indication of the suggested change 134 may be provided to the PSAP terminal 110, and in particular rendered at the display screen 114 and/or output as audio from the headset 119, and the input device 116 may be operated by the operator 112 to approve or deny the suggested change 134. The indication of the suggested change 134 may further include any suitable indication of the in-call data 132, which caused the suggested change 134 to be generated by the machine-learning algorithm 105.

Alternatively, a computing device of the PSAP terminal 110 and/or the PSAP 104 may be configured to approve or deny the suggested change 134, for example using dispatch data, and the like, which may indicate numbers of officers 108 available for dispatch to incidents. For example, when the suggested change 134 includes adding a communication device 106 to the initial talkgroup 128, which would mean dispatching another officer 108 to the incident, and a number of available officers 108 available for dispatch is above a threshold number (e.g., such as five officers 108, ten officers 108, fifteen officers 108, amongst other possibilities), the suggested change 134 may be approved. Conversely, when a number of available officers 108 available for dispatch is below the threshold number, the suggested change 134 may be denied. The threshold number may be static or dynamic; for example, the threshold number may depend on a total number of available officers 108 (e.g., as a percentage thereof), a time of day and/or historical data (e.g., different from the historical data 122) indicating an expected number of incidents and/or expected usage of officers 108, and the like.

When the suggested change 134 is approved, the suggested change 134 may be implemented, however when the suggested change 134 is denied, the suggested change 134 may not be implemented.

It is further understood that the computing device 102 may determine a machine-learning score of the initial talkgroup 128 or the suggested change 134, which may be based on any of the above described in-call data 132, thresholds, and the like, and/or combinations thereof and/or weighted combinations thereof.

For example, the machine-learning algorithm 105 may, when generating the initial talkgroup 128 and/or the suggested change 134, also generate an associated respective probability score, for example on a scale of "0" to "100", with higher scores indicating a higher level of respective confidence in predicting and/or generating an initial talkgroup and/or a suggested change and/or efficiency thereof. Such a probability score may be based on any of the above described in-call data 132, thresholds, and the like, and/or combinations thereof and/or weighted combinations thereof.

Hence, as depicted, the initial talkgroup 128 may be output from the machine-learning algorithm 105 labelled with a score 136, which may be between 0 and 100, and the suggested change 134 is labelled with a score 138, which may be between 0 and 100. A score 136 above a respective threshold score (e.g., 85%, 90%, 95%, amongst other possibilities) is generally understood to be indicative of a threshold-based positive reinforcement of efficiency of the initial talkgroup 128; conversely, a score 136 below the respective threshold score is generally understood to be indicative of a threshold-based negative reinforcement of efficiency of the initial talkgroup 128.

Similarly, a score 138 above a respective threshold score (e.g., 85%, 90%, 95%, amongst other possibilities) is generally understood to be indicative of a threshold-based positive reinforcement of efficiency of the suggested change 134; conversely, a score 138 below the respective threshold score is generally understood to be indicative of a threshold-based negative reinforcement of efficiency of the suggested change 134.

The respective threshold scores for the initial talkgroup 128 and the suggested change 134 may be the same or different. For example, a threshold score for the initial talkgroup 128 may be 85% while a threshold score for the suggested change 134 may be 90%.

In such examples, such threshold-based positive reinforcements of efficiency and/or such threshold-based negative reinforcements of efficiency may be provided to the machine-learning algorithm 105 in a machine-learning feedback loop to better train the machine-learning algorithm 105 to better generate talkgroups and/or suggested changes.

For example, the score 136, the incident indication 126 and the initial talkgroup 128 may be provided to the machine-learning algorithm 105 as training data in a machine-learning feedback loop, with a score 136 being above a respective threshold score indicating that such training data represents a threshold-based positive reinforcement of efficiency of the initial talkgroup 128, and a score 136 being below the respective threshold score indicating that such training data represents a threshold-based negative reinforcement of efficiency of the initial talkgroup 128.

Similarly, the score 138, the in-call data 132 and the suggested change 134 may be provided to the machine-learning algorithm 105 as training data in a machine-learning feedback loop, with a score 138 being above a respective threshold score indicating that such training data represents a threshold-based positive reinforcement of efficiency of the suggested change 134, and a score 138 being below the respective threshold score indicating that such training data represents a threshold-based negative reinforcement of efficiency of the suggested change 134.

In some examples, only threshold-based positive reinforcements of efficiency may be provided to the machine-learning algorithm 105 in a machine-learning feedback loop, while in other examples only threshold-based negative reinforcements of efficiency may be provided to the machine-learning algorithm 105 in a machine-learning feedback loop. In yet further examples both threshold-based positive reinforcements of efficiency and hold-based negative reinforcements of efficiency may be provided to the machine-learning algorithm 105 in a machine-learning feedback loop.

In yet further examples, the scores 136, 138 may not be generated by the machine-learning algorithm 105. Rather, indications of the initial talkgroup 128 and/or the suggested change 134 may be provided to the PSAP terminal 110, and the input device 116 may be operated to generate the scores 136, 138. Alternatively, indications of the initial talkgroup 128 and/or the suggested change 134 may be provided to one or more communication devices 106 (e.g., communication devices 106 of the initial talkgroup 128) and respective input devices thereof may be operated to generate the scores 136, 138.

In such examples, the scores 136, 138 may be binary with, for example, a respective score of "1" indicating a threshold-based positive reinforcement of efficiency of the initial talkgroup 128 or the suggested change 134, and a score of "0" indicating a threshold-based negative reinforcement of efficiency of the initial talkgroup 128 or the suggested change 134. In such examples, it is understood that a threshold may be "0.5" and/or any suitable value that is greater than "0" and less than "1", such that a score 136, 138 of "1" is always above such a threshold and a score 136, 138 of "0" is always below such a threshold.

In some examples, binary versions of the scores 136, 138 may be generated using the aforementioned selectable options provided at the display screen 114 (e.g., with "Yes" indicating a score 136, 138 of "1", and "No" indicating a score 136, 138 of "0") that may be used to rate the initial talkgroup 128 and/or the suggested change 134. In some examples, non-binary versions of the scores 136, 138 may be generated using the aforementioned selectable options that that "rate" network resources associated with the initial talkgroup 128 and/or the suggested change 134, with a selected number on scales of "0" to "5", "0" to "10", "0" to "100", amongst other possibilities, indicating a respective score 136, 138. When a score 136, 138 is to be on a scale of "0" to "100", and the like, and the scale of the selectable options is not on a scale from "0" to "100", a score associated with a selected option may be converted to a scale from "0" to "100". For example, if a scale of "0" to "5" is being used, and "5" is selected, "5" may be converted to "100" as "5" is the highest number on the scale of "0" to "5", and "100" is the highest number on the scale of "0" to "100".

Furthermore, such a providing of the indications of the initial talkgroup 128 and/or the suggested change 134 to the PSAP terminal 110 may be a component of an approval process. For example, prior to establishing the initial talkgroup 128 in the network 109, and/or implementing the suggested change 134, indications of such may be provided to the PSAP terminal 110 for approval or denial thereof. An approval of the initial talkgroup 128 may not only cause the initial talkgroup 128 to be established in the network 109, but an approval may cause a score 136 of "1" (e.g., on a binary scale) or "100" (e.g., on a 0-100 scale) to be assigned to the initial talkgroup; conversely, a denial of the initial talkgroup 128 in the network 109 may not only cause the initial talkgroup 128 to not be established in the network 109, but a denial may cause a score 136 of "0" to be assigned to the initial talkgroup 128. In particular, when the initial talkgroup 128 is denied, an indication of the initial talkgroup 128 and the score 136 of "0" (e.g., on either a binary or a 0-100 scale) may be provided to the machine-learning algorithm 105, as well as the indication 126 in feedback loop to further train the machine-learning algorithm 105, which may thereafter again generate an initial talkgroup.

Similarly, an approval of the suggested change 134 may not only cause the suggested change 134 to be established in the network 109, but an approval may cause a score 138 of "1" (e.g., on a binary scale) or "100" (e.g., on a 0-100 scale) to be assigned to the initial talkgroup; conversely, a denial of the suggested change 134 in the network 109 may not only cause the suggested change 134 to not be established in the network 109, but a denial may cause a score 138 of "0" (e.g., on either a binary or a 0-100 scale) to be assigned to the suggested change 134. In particular, when the suggested change 134 is denied, an indication of the suggested change 134 and the score 138 of "0" may be provided to the machine-learning algorithm 105, as well as the indication 126 in feedback loop to further train the machine-learning algorithm 105, which may thereafter again generate an initial talkgroup In yet further examples, scores 136, 138 may be generated by the feedback computing device 124. For example, the indication 126, and indications of the initial talkgroup 128, the in-call data 132 and the suggested change 134 may be provided to the feedback computing device 124, which may be a component of the system 100 and/or external to the system 100, and the feedback computing device 124 may have been specifically trained to generate scores for talkgroups and/or suggested changes to talkgroups.

Alternatively, the indication 126, and indications of the initial talkgroup 128, the in-call data 132 and the suggested change 134 may be provided to the feedback computing device 124 and the scores 136, 138 as generated by the machine-learning algorithm 105 may be provided to the feedback computing device 124, which may have been specifically trained to verify scores for talkgroups and/or suggested changes to talkgroups.

The feedback computing device 124 may generate and/or verify scores and provide the generated and/or verified scores as feedback and/or as a portion of training data to train the machine-learning algorithm 105 in a machine-learning feedback loop.

Put another way, the scores 136, 138 may be generated and/or provided in any suitable manner and/or by any suitable computing device and/or communication device of the system 100.

Regardless, the computing device 102 may implement a machine-learning feedback loop that includes providing a machine-learning score to the machine-learning algorithm 105 to further train the machine-learning algorithm 105.

In some examples, the scores 136, 138, the indication 126, and indications of the initial talkgroup 128, the in-call data 132 and the suggested change 134 may be stored in the historical data 122 at the memory 120 such that a machine-learning feedback loop may be implemented at any suitable time, which may be during the incident and/or while the initial talkgroup 128 is in use, or after the incident/or after the initial talkgroup 128 has ended.

It is further understood that the training of the machine-learning algorithm 105 may be based on the type of the incident indicated by the indication 126, and the like. For example, a machine-learning feedback loop as described herein may generation of talkgroups for specific incident types using details of a specific incident, such that the machine-learning algorithm 105 may generate a talkgroup for the specific incident types. Put another way, using details of a given current incident of a given incident type, the machine-learning algorithm 105 attempts to generate a talkgroup determined to be efficient based previous incidents of a same and/or similar incident type, having same and/or similar details of the given current incident.

Figure 2:
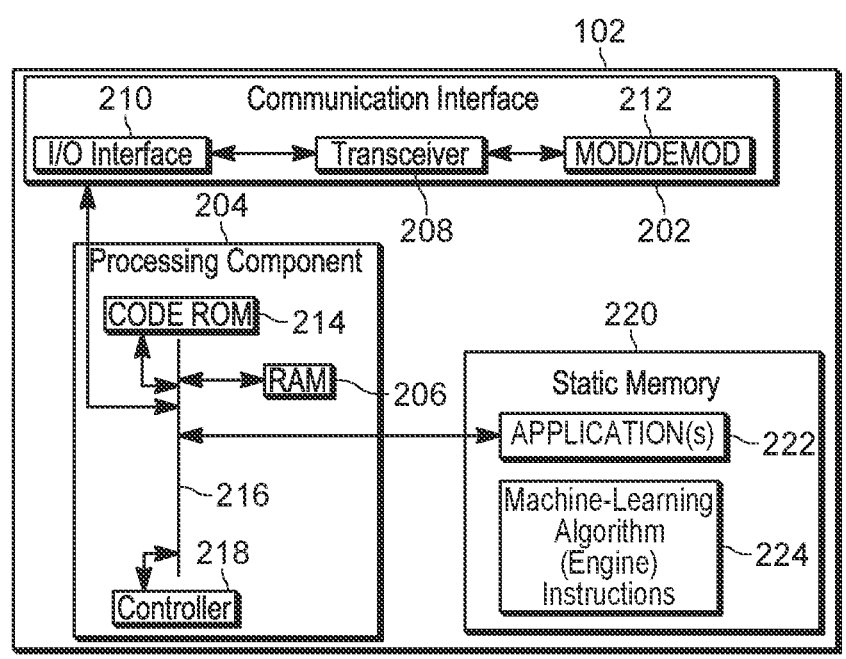
FIG. 2 is a device diagram showing a device structure of a computing device for training machine-learning algorithms to generate talkgroups based on in-call data, in accordance with some examples.

Attention is next directed to FIG. 2, which depicts a schematic block diagram of an example of the computing device 102. While the computing device 102 is depicted in FIG. 2 as a single component, functionality of the computing device 102 may be distributed among a plurality of components and the like including, but not limited to, any suitable combination of one or more servers, one or more cloud computing devices, one or more proxy devices, and the like. In some examples, a portion of the functionality of the computing device 102 may be integrated with the PSAP 104.

As depicted, the computing device 102 comprises: a communication interface 202, a processing unit 204, a Random-Access Memory (RAM) 206, one or more wireless transceivers 208 (e.g., which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 102 may have any suitable structure and/or configuration. Furthermore, a portion of the memory 220 may comprise the memory 120.

While not depicted, the computing device 102 may include, and/or be in communication with, one or more of an input device and a display screen (and/or any other suitable notification device) and the like, such as the input device 116 and/or the display screen 114 of the PSAP terminal 110, and the like.

As shown in FIG. 2, the computing device 102 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for training machine-learning algorithms to generate talkgroups based on in-call data. For example, in some examples, the computing device 102 and/or the controller 218 specifically comprises a computer executable engine configured to implement functionality for training machine-learning algorithms to generate talkgroups based on in-call data.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

Figure 3:
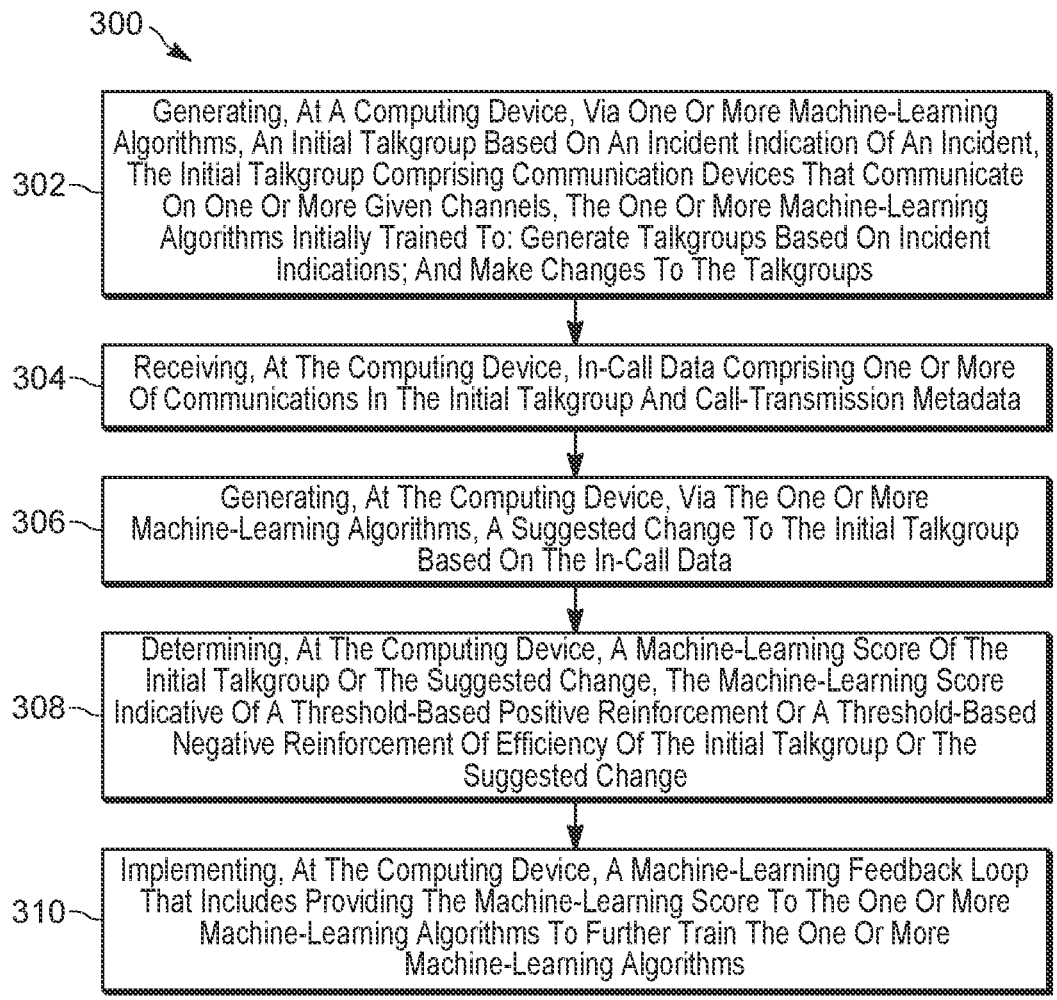
FIG. 3 is a flowchart of a method for training machine-learning algorithms to generate talkgroups based on in-call data, in accordance with some examples.

In particular, the memory 220 stores instructions corresponding to the at least one application 222 (and the programming instructions 224) that, when executed by the controller 218, enables the controller 218 to implement functionality for training machine-learning algorithms to generate talkgroups based on in-call data, including but not limited to, the blocks of the method set forth in FIG. 3.

The application 222 and/or the programming instructions 224 may include programmatic algorithms, and the like, to implement functionality as described herein, such as determining when to place the machine-learning algorithm 105 into a training and/or feedback mode to implement a machine-learning feedback loop and/or storing historical data 122 and/or any other suitable functionality.

As depicted, the memory 220 further stores one or more sets of machine-learning algorithm (and/or engine) instructions 224 that, when executed by the controller 218, enables the controller 218 to implement the one or more machine-learning algorithms (and/or engines) 105.

The one or more machine-learning algorithms 105 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments, such as PSAP environments, and the like. Any suitable machine-learning algorithm and/or deep learning algorithm and/or neural network is within the scope of present examples, with the instructions 224 adapted accordingly.

While details of the PSAP 104, the PSAP terminal 110, and the communication devices 106 are not depicted, the PSAP 104, the PSAP terminal 110, and the communication devices 106 may have components similar to the computing device 102 adapted, however, for the functionality thereof.

Attention is now directed to FIG. 3, which depicts a flowchart representative of a method 300 for training machine-learning algorithms to generate talkgroups based on in-call data. The operations of the method 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222 and/or the instructions 224. The method 300 of FIG. 3 is one way that the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218, and/or the computing device 102, generates, via the one or more machine-learning algorithms 105, the initial talkgroup 128 based on the incident indication 126 of an incident, the initial talkgroup 128 comprising communication devices 106 that communicate on one or more given channels 130, the one or more machine-learning algorithms 105 initially trained to: generate talkgroups based on incident indications; and make changes to the talkgroups.

At a block 304, the controller 218, and/or the computing device 102 receives (e.g., via the communication interface 202) the in-call data 132 comprising one or more of communications in the initial talkgroup 128 and call-transmission metadata.

At a block 306, the controller 218, and/or the computing device 102, generates, via the one or more machine-learning algorithms 105, the suggested change 134 to the initial talkgroup 128 based on the in-call data 132.

At a block 308, the controller 218, and/or the computing device 102, determines a machine-learning score 136, 138 of the initial talkgroup 128 or the suggested change 134, the machine-learning score 136, 138 indicative of a threshold-based positive reinforcement or a threshold-based negative reinforcement of efficiency of the initial talkgroup 128 or the suggested change 134.

At a block 310, the controller 218, and/or the computing device 102, implements a machine-learning feedback loop that includes providing the machine-learning score 136, 138 to the one or more machine-learning algorithms 105 to further train the one or more machine-learning algorithms 105.

Aspects of the method 300 are next described.

In some examples, the method 300 may further comprise the controller 218, and/or the computing device 102 receiving (e.g., via the communication interface 212) an acceptance or denial of the suggested change 134, for example from the PSAP 104 and/or the PSAP terminal 110, as described above. In these examples, the machine-learning score 138 may comprise a threshold-based positive reinforcement of efficiency of the suggested change 134 when the suggested change 134 is accepted. Conversely, the machine-learning score 138 may comprise a threshold-based negative reinforcement of efficiency of the suggested change 134 when the suggested change 134 is denied.

In some examples, the in-call data 132 may comprise one or more keywords identified in the communications of the initial talkgroup 128, as described above. In these examples, the machine-learning score 136, 138 may comprise a threshold-based positive reinforcement of efficiency of the initial talkgroup 128 or the suggested change 134 when the one or more keywords includes one or more of a first set of positive keywords. Conversely, the machine-learning score 136, 138 may comprise a threshold-based negative reinforcement of efficiency of the initial talkgroup 128 or the suggested change 134 when the one or more keywords includes one or more of a second set of negative keywords. For example, the first set of positive keywords may include, but is not limited to, words and/or phrases, such as "good", "communicating well", and the like, amongst other possibilities. Conversely, the second set of negative keywords may include, but is not limited to, words and/or phrases, such as "not answering", "always busy", and the like, amongst other possibilities. It is further understood that the machine-learning algorithm 105 may be trained over time to recognize positive keywords and/or negative keywords, and to hence add to the first set of positive keywords and the second set of positive keywords.

Furthermore, the first set of positive keywords may include, but is not limited to an answer "Yes" to a question such as "Was this talkgroup efficient?" (e.g., provided in any suitable manner, as described herein), and the like. Conversely, the second set of negative keywords may include, but is not limited to an answer "No" to a question such as "Was this talkgroup efficient?", and the like.

In some further examples, the in-call data 132 may comprise one or more indications of inactive communication devices 106 in the initial talkgroup 128, as described above. In these examples, the suggested change 134 to the initial talkgroup 128 may comprise removing an inactive communication device 106 in the initial talkgroup 128. Furthermore, in these examples, the machine-learning score 138 for the suggested change 134 may comprise a threshold-based positive reinforcement of efficiency of the suggested change 134 when the inactive communication device 106 is removed from the initial talkgroup 128. Conversely, the machine-learning score 138 for the suggested change 134 may comprise a threshold-based negative reinforcement of efficiency of the suggested change 134 when the inactive communication device 106 is not removed from the initial talkgroup 128. Put another way, the suggested change 134 may comprise removing an inactive communication device 106 from the initial talkgroup 128, and when the inactive communication device 106 from the initial talkgroup 128 is removed (e.g., upon approval via the PSAP 104 and/or the PSAP terminal 110), the machine-learning score 138 may be "1" (e.g., on a binary scale), or "100" (e.g., on a 0-100 scale), and hence a threshold-based positive reinforcement of efficiency of the suggested change 134; conversely, when the inactive communication device 106 from the initial talkgroup 128 is not removed (e.g., upon being denied via the PSAP 104 and/or the PSAP terminal 110), the machine-learning score 138 may be "0" (e.g., on either a binary or a 1-100 scale) and hence a threshold-based negative reinforcement of efficiency of the suggested change 134.

In yet further examples, the in-call data 132 may comprise one or more indications a first number of active communication devices 106 or a second number of inactive communication devices 106 in the initial talkgroup 128. In these examples, the machine-learning score 136 for the initial talkgroup 128 may comprise a threshold-based positive reinforcement of efficiency of the initial talkgroup 128 when the first number of active communication devices 106 is above a first threshold or the second number of inactive communication device 106 is below a second threshold. Conversely, the machine-learning score 136 for the initial talkgroup 128 may comprise a threshold-based negative reinforcement of efficiency of the initial talkgroup 128 when the first number of active communication devices 106 is below the first threshold or the second number of inactive communication device 106 is above the second threshold.

For example, the first threshold for a number of active communication devices 106 may be 50%, 60%, 70%, amongst other possibilities, of a total number of communication devices 106 in the initial talkgroup 128, and the second threshold for a number of inactive communication devices 106 may be 50%, 30%, 30%, amongst other possibilities, of a total number of communication devices 106 in the initial talkgroup 128.

Put another way, when a number of active communication devices 106 is above the first threshold, and/or the number of inactive communication devices 106 is below the second threshold, the machine-learning score 136 may indicate that network resources for the initial talkgroup 128 are being used efficiently. Conversely, when the number of active communication devices 106 is below the first threshold, and/or the number of inactive communication devices 106 is above the second threshold, the machine-learning score 136 may indicate that network resources for the initial talkgroup 128 are being used inefficiently.

In further examples, the machine-learning score 138 may comprise a threshold-based positive reinforcement of efficiency of the initial talkgroup 128 when the call-transmission metadata (e.g., of the in-call data 132) meets a first set of positive call-transmission criteria, and the machine-learning score of the initial talkgroup 128 may comprise a threshold-based negative reinforcement of efficiency of the initial talkgroup 128 when the call-transmission metadata meets a second set of negative call-transmission criteria.

For example, a first set of positive call-transmission criteria may include, but is not limited to: a number of PTT button activations of a communication device 106 being above a threshold number; a rate of PTT button activations of a communication device 106 being above a threshold rate; a rate of "busys" being below a threshold rate; a time, and/or an average time, between one communication device 106 ending a transmission, and another communication device 106 starting a transmission being above a threshold time period; a number of active communication devices 106; and the like, amongst other possibilities.

Conversely, a second set of negative call-transmission criteria may include, but is not limited to: a number of PTT button activations of a communication device 106 being below a threshold number; a rate of PTT button activations of a communication device 106 being below a threshold rate; a rate of "busys" being above a threshold rate; a time, and/or an average time, between one communication device 106 ending a transmission, and another communication device 106 starting a transmission being below a threshold time period; and the like, amongst other possibilities In yet further examples, the in-call data 132 may comprise an indication of a time period that the initial talkgroup 128 is active, as described above. In these examples, the machine-learning score 136 may comprise a threshold-based positive reinforcement of efficiency of the initial talkgroup 128 when the time period is above a threshold usage time based on a duration of the incident. Conversely, the machine-learning score of the initial talkgroup 128 may comprise a threshold-based negative reinforcement of efficiency of the suggested change 134 when the time period is below the threshold usage time.

In yet further examples, the method 300 may further comprise receiving, via an input device a change to the initial talkgroup 128. Such a change may be received via the PSAP terminal 110 (e.g., via the input device 116) and/or any other suitable device of the system 100 including, but not limited to, a communication device 106. In these examples, the machine-learning score 136 may comprise a threshold-based negative reinforcement of efficiency of the initial talkgroup 128 based on the change received via the input device. Hence, for example, the PSAP terminal 110, and the like, may be used to change the initial talkgroup 128, which may indicate that the initial talkgroup 128 was not efficiently using network resources and, as such, the machine-learning score 136 may be adapted accordingly (e.g., the machine-learning score 136 may be set to "0" on either a binary or a 0-100 scale).

As has previously been described, the suggested change 134 to the initial talkgroup 128 may comprise one or more of: removing a communication device 106 from the initial talkgroup 128; adding a further communication device 106 to the initial talkgroup 128; and changing the initial talkgroup 128 to a different talkgroup of respective communication devices 106.

Furthermore, the method 300 may further comprise: generating a plurality of machine-learning scores of the initial talkgroup 128 or the suggested change 134, the plurality of machine-learning scores indicative of a combination of respective threshold-based reinforcements; weighting the plurality of machine-learning scores; and generating a machine-learning score 136, 138 from the plurality of machine-learning scores as weighted.

For example, herein, a plurality of criteria are described that may be used to determine threshold-based positive reinforcement and/or threshold-based negative reinforcements, which may be used to determine scores 136, 138. However, some criteria may be weighted higher than other criteria. For example, when both keywords and a rate of "busys" are used to determine a score 136, respective machine-learning scores may be assigned to the keyword criteria (e.g., based on the keywords being in the first set of positive keywords or the second set of negative keywords), and the rate of "busys" (e.g., based on the rate being above or below a threshold rate); however, a machine-learning score assigned to the rate of "busys" may be weighted higher (e.g., 80%) than a machine-learning score assigned to the keywords (e.g., 20%). Hence, when the keyword machine-learning score is "70" (e.g., on a scale of "0" to "100"), and the "busys" machine-learning score is "20" (e.g., on a scale of "0" to "100"), a total machine-learning score 136 of the initial talkgroup 128 may be determined from (0.2×70)+(0.8×20)=30, which may be below a threshold score of "60", indicating that the initial talkgroup 128 is not using network resources efficiently. Put another way, even though keywords may be generally positive, a rate of "busys" is more likely to indicate whether the initial talkgroup 128 is using network resources efficiently.

Attention is next directed back to FIG. 1, as it is now apparent that FIG. 1 depicts an example of aspects of the method 300. In particular, as has been previously described with respect to FIG. 1, the computing device 102 may generate, via the machine-learning algorithm 105, the initial talkgroup 128 (e.g., at the block 302 of the method 300), receive the in-call data 132 (e.g., at the block 304 of the method 300), generate the suggested change 134 (e.g., at the block 306 of the method 300), and determine the machine-learning scores 136, 138 (e.g., at the block 308 of the method 300).

Attention is next directed to FIG. 4, which depicts an example of further aspects of the method 300. FIG. 4 is substantially similar to FIG. 1, with like components having like numbers.

In particular, FIG. 4 depicts an example of a machine-learning feedback loop 400 of the block 310 of the method 300. For example, as depicted, the indication 126, indications of the initial talkgroup 128, the in-call data 132 and the suggested change 134, as well as the scores 136, 138, are provided to the machine-learning algorithm 105 as feedback 402, 404 and/or training data, when, for example, machine-learning algorithm 105 is in a training mode. In some examples, as depicted, the machine-learning feedback loop 400 may be implemented after the initial talkgroup 128 has ended. Furthermore, the indication 126, indications of the initial talkgroup 128, the in-call data 132 and the suggested change 134, as well as the scores 136, 138 may have been previously stored in historical data 122 and retrieved from the memory 120 for use in the machine-learning feedback loop 400.

For example, a first set of feedback 402 may include the indication 126 being used as input training data and the initial talkgroup 128 being used as output training data, with the initial talkgroup 128 labeled with the score 136 to indicate whether the combination of the indication 126 and the initial talkgroup 128 is an example of a threshold-based positive reinforcement or a threshold-based negative reinforcement of efficiency of the initial talkgroup 128.

Similarly, a second set of feedback 404 may include the in-call data 132 being used as input training data and the suggested change 134 being used as output training data, with the suggested change 134 labelled with the score 138 to indicate whether the combination of in-call data 132 and the suggested change 134 is an example of a threshold-based positive reinforcement or a threshold-based negative reinforcement of efficiency of the suggested change 134.

Hence, using the feedback 404, the machine-learning algorithm 105 may be better trained to generate talkgroups and make changes to the talkgroups while the talkgroups are being used. As such, the talkgroups generated by the machine-learning algorithm 105 may be dynamically changed to improve use of network resources and bandwidth.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot implement machine-learning feedback loops, cannot process call-transmission metadata and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    generating, at a computing device, via one or more machine-learning algorithms, an initial talkgroup based on a public-safety incident indication of an incident, the initial talkgroup comprising communication devices that communicate on one or more given channels, the one or more machine-learning algorithms initially trained to: generate talkgroups based on public-safety incident indications; and make changes to the talkgroups;
    receiving, at the computing device, in-call data comprising one or more of communications in the initial talkgroup and call-transmission metadata;
    generating, at the computing device, via the one or more machine-learning algorithms, a suggested change to the initial talkgroup based on the in-call data;
    determining, at the computing device, a machine-learning score of the initial talkgroup or the suggested change, the machine-learning score indicative of a threshold-based positive reinforcement or a threshold-based negative reinforcement of efficiency of the initial talkgroup or the suggested change, wherein the threshold-based positive reinforcement and the threshold-based negative reinforcement of efficiency are respectively indicative of efficient, or inefficient, use of network resources; and
    implementing, at the computing device, a machine-learning feedback loop that includes providing the machine-learning score to the one or more machine-learning algorithms to further train the one or more machine-learning algorithms,
    wherein the in-call data comprises one or more keywords identified in the communications of the initial talkgroup, and
    wherein the machine-learning score comprises the threshold-based positive reinforcement of efficiency of the initial talkgroup or the suggested change when the one or more keywords includes one or more of a first set of positive keywords, and
    wherein the machine-learning score comprises the threshold-based negative reinforcement of efficiency of the initial talkgroup or the suggested change when the one or more keywords includes one or more of a second set of negative keywords.

2. The method of claim 1, further comprising:
    receiving an acceptance or denial of the suggested change, and
    wherein the machine-learning score comprises the threshold-based positive reinforcement of efficiency of the suggested change when the suggested change is accepted, and the machine-learning score comprises the threshold-based negative reinforcement of efficiency of the suggested change when the suggested change is denied.

3. The method of claim 1, wherein the in-call data comprises one or more indications of inactive communication devices in the initial talkgroup,
    wherein the suggested change to the initial talkgroup comprises removing an inactive communication device in the initial talkgroup, and
    wherein the machine-learning score for the suggested change comprises the threshold-based positive reinforcement of efficiency of the suggested change when the inactive communication device is removed from the initial talkgroup.

4. The method of claim 1, wherein the in-call data comprises one or more indications a first number of active communication devices or a second number of inactive communication devices in the initial talkgroup,
    wherein the machine-learning score for the initial talkgroup comprises the threshold-based positive reinforcement of efficiency of the initial talkgroup when the first number of active communication devices is above a first threshold or the second number of inactive communication device is below a second threshold, and
    wherein the machine-learning score for the initial talkgroup comprises the threshold-based negative reinforcement of efficiency of the initial talkgroup when the first number of active communication devices is below the first threshold or the second number of inactive communication device is above the second threshold.

5. The method of claim 1, wherein the machine-learning score comprises the threshold-based positive reinforcement of efficiency of the initial talkgroup when the call-transmission metadata meets a first set of positive call-transmission criteria, and
   wherein the machine-learning score of the initial talkgroup comprises the threshold-based negative reinforcement of efficiency of the initial talkgroup when the call-transmission metadata meets a second set of negative call-transmission criteria.

6. The method of claim 1, wherein the in-call data comprises an indication of a time period that the initial talkgroup is active,
   wherein the machine-learning score comprises the threshold-based positive reinforcement of efficiency of the initial talkgroup when the time period is above a threshold usage time based on a duration of the incident, and
   wherein the machine-learning score of the initial talkgroup comprises the threshold-based negative reinforcement of efficiency of the suggested change when the time period is below the threshold usage time.

7. The method of claim 1, further comprising receiving, via an input device, a change to the initial talkgroup,
   wherein the machine-learning score comprises the threshold-based negative reinforcement of efficiency of the initial talkgroup based on the change received via the input device.

8. The method of claim 1, wherein the suggested change to the initial talkgroup comprises one or more of: removing a communication device from the initial talkgroup; adding a further communication device to the initial talkgroup; and changing the initial talkgroup to a different talkgroup of respective communication devices.

9. The method of claim 1, further comprising:
   generating a plurality of machine-learning scores of the initial talkgroup or the suggested change, the plurality of machine-learning scores indicative of a combination of respective threshold-based reinforcements;
   weighting the plurality of machine-learning scores; and
   generating the machine-learning score from the plurality of machine-learning scores as weighted.

10. A device comprising:
a communication interface; and
a controller configured to:
   generate, via one or more machine-learning algorithms, an initial talkgroup based on a public-safety incident indication of an incident, the initial talkgroup comprising communication devices that communicate on one or more given channels, the one or more machine-learning algorithms initially trained to: generate talkgroups based on public-safety incident indications; and make changes to the talkgroups;
   receive, via the communication interface, in-call data comprising one or more of communications in the initial talkgroup and call-transmission metadata;
   generate, via the one or more machine-learning algorithms, a suggested change to the initial talkgroup based on the in-call data;
   determine a machine-learning score of the initial talkgroup or the suggested change, the machine-learning score indicative of a threshold-based positive reinforcement or a threshold-based negative reinforcement of efficiency of the initial talkgroup or the suggested change, wherein the threshold-based positive reinforcement and the threshold-based negative reinforcement of efficiency are respectively indicative of efficient, or inefficient, use of network resources; and
   implement a machine-learning feedback loop that includes providing the machine-learning score to the one or more machine-learning algorithms to further train the one or more machine-learning algorithms,
   wherein the in-call data comprises one or more keywords identified in the communications of the initial talkgroup,
   wherein the machine-learning score comprises the threshold-based positive reinforcement of efficiency of the initial talkgroup or the suggested change when the one or more keywords includes one or more of a first set of positive keywords, and
   wherein the machine-learning score comprises the threshold-based negative reinforcement of efficiency of the initial talkgroup or the suggested change when the one or more keywords includes one or more of a second set of negative keywords.

11. The device of claim 10, wherein the controller is further configured to:
   receive an acceptance or denial of the suggested change, and
   wherein the machine-learning score comprises the threshold-based positive reinforcement of efficiency of the suggested change when the suggested change is accepted, and the machine-learning score comprises the threshold-based negative reinforcement of efficiency of the suggested change when the suggested change is denied.

12. The device of claim 10, wherein the in-call data comprises one or more indications of inactive communication devices in the initial talkgroup,
   wherein the suggested change to the initial talkgroup comprises removing an inactive communication device in the initial talkgroup, and
   wherein the machine-learning score for the suggested change comprises the threshold-based positive reinforcement of efficiency of the suggested change when the inactive communication device is removed from the initial talkgroup.

13. The device of claim 10, wherein the in-call data comprises one or more indications a first number of active communication devices or a second number of inactive communication devices in the initial talkgroup,
   wherein the machine-learning score for the initial talkgroup comprises the threshold-based positive reinforcement of efficiency of the initial talkgroup when the first number of active communication devices is above a first threshold or the second number of inactive communication device is below a second threshold, and
   wherein the machine-learning score for the initial talkgroup comprises the threshold-based negative reinforcement of efficiency of the initial talkgroup when the first number of active communication devices is below the first threshold or the second number of inactive communication device is above the second threshold.

14. The device of claim 10, wherein the machine-learning score comprises the threshold-based positive reinforcement of efficiency of the initial talkgroup when the call-transmission metadata meets a first set of positive call-transmission criteria, and wherein the machine-learning score of the initial talkgroup comprises the threshold-based negative reinforcement of efficiency of the initial talkgroup when the call-transmission metadata meets a second set of negative call-transmission criteria.

15. The device of claim 10, wherein the in-call data comprises an indication of a time period that the initial talkgroup is active, wherein the machine-learning score comprises the threshold-based positive reinforcement of efficiency of the initial talkgroup when the time period is above a threshold usage time based on a duration of the incident, and wherein the machine-learning score of the initial talkgroup comprises the threshold-based negative reinforcement of efficiency of the suggested change when the time period is below the threshold usage time.

16. The device of claim 10, wherein the controller is further configured to receive, via an input device, a change to the initial talkgroup, wherein the machine-learning score comprises the threshold-based negative reinforcement of efficiency of the initial talkgroup based on the change received via the input device.

17. The device of claim 10, wherein the suggested change to the initial talkgroup comprises one or more of: removing a communication device from the initial talkgroup; adding a further communication device to the initial talkgroup; and changing the initial talkgroup to a different talkgroup of respective communication devices.

18. The device of claim 10, wherein the controller is further configured to:

generate a plurality of machine-learning scores of the initial talkgroup or the suggested change, the plurality of machine-learning scores indicative of a combination of respective threshold-based reinforcements;

weight the plurality of machine-learning scores; and generate the machine-learning score from the plurality of machine-learning scores as weighted.

\* \* \* \* \*